UNITED STATES PATENT OFFICE 2,452,209

CELLULOSE ETHER PLASTICIZED WITH BIS(ALLYL LACTATE) MALEATE

Chessie E. Rehberg, Glenside, and Charles H. Fisher, Abington, Pa., assignors to the United States of America as represented by the Secretary of Agriculture No Drawing. Application August 12, 1944, Serial No. 549,244

2 Claims. (Cl. 106—182)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to plastic compositions, and more particularly to compositions comprising cellulose ethers and plasticizers and modifiers.

One object of this invention is to produce compositions of matter which may be made into permanently strong and flexible sheets or films of any desired thickness.

Another object of this invention is the production of plastic compositions whose properties are not changed to any material extent by large changes in temperature and which are flexible at low temperatures.

Other objects and advantages of this invention will be apparent from the following disclosure.

We have found that the esters of hydroxy esters, such as lactic esters with polybasic acids or their anhydrides or acid chlorides, are useful plasticizers and modifiers for cellulose ethers. The plastic compositions prepared from these complex lactic esters, glycolic esters, or other hydroxy esters, and ethyl cellulose are flexible and rubbery, and these properties are maintained at low temperatures.

For the manufacture of the plastic compositions of this invention, the cellulose derivative and plasticizer may be dissolved in solvents such as acetone, toluene, or ethylene dichloride, and the solvent allowed to evaporate. Another method comprises mixing the cellulose derivative and lactic ester by milling or mechanical methods. Fillers, dyes, extenders, and pigments may be included.

Many hydroxy esters may be reacted with various polybasic acids or their derivatives to prepare with the complex ester mixtures used as plasticizers for cellulose derivatives. Thus the succinates, carbonates, oxalates, fumarates, itaconates, aconitates, citraconates, glutarates, adipates, chloromaleates, sebacates, phosphates, borates, and malonates of alkyl or alkenyl citrates, malates, tartrates, gluconates, and mandelates may be used. These complex esters may be used with the cellulose ether in various proportions, but, in general, we prefer to prepare compositions containing 20 to 60 percent by weight of the plasticizer.

Examples given in the following table were prepared by dissolving ethyl cellulose (Hercules Type N-100) and the complex ester plasticizer in acetone, pouring the solution into a flat dish and allowing the solvent to evaporate. The resulting films were examined for compatibility and test specimens were used in conjunction with a Scott IP-2 Serigraph to determine tensile strength and elongation at break. Brittle temperatures were determined with apparatus of the type described by Selker and coworkers (Industrial & Engineering Chemistry 34, 157–160 (Feb. 1942)). A Shore durometer (type A) was used to determine hardness.

*Ethyl cellulose plasticized with lactic esters*

| Plasticizer, percent by weight | Tensile strength, lbs. per sq. in. | Ultimate elongation, percent | Shore durometer hardness, Type A | | Brittle temp., °C. |
|---|---|---|---|---|---|
| | | | Initial | After 10 seconds | |
| Castor oil (50) | 2,660 | 80 | 85 | 82 | Below −75 |
| Bis(isobutyl lactate)-maleate (50) | 840 | 60 | 65 | 55 | |
| Bis(n-butyl lactate)-maleate (50) | 438 | 65 | 75 | 67 | |
| Bis(ethyl lactate)-maleate (50) | 1,500 | 100 | 81 | 78 | |
| Bis(methyl lactate)-maleate (50) | 3,750 | 25 | 65 | 60 | |
| Bis(allyl lactate)-maleate (50) | 1,580 | 60 | 74 | 72 | |
| Bis(methallyl lactate)-maleate (50) | 315 | 70 | 79 | 72 | |
| Bis(beta-ethoxyethyl lactate)-maleate (50) | 2,140 | 90 | 85 | 78 | −61 |
| Bis(methyl lactate)-phthalate (50) | 2,660 | 40 | 83 | 82 | −18 |
| Bis(beta-ethoxyethyl lactate)-phthalate (50) | 1,965 | 70 | 83 | 82 | −52 |
| Bis(allyl lactate)-phthalate (50) | 2,130 | 40 | 85 | 82 | −36 |
| Tris(ethyl lactate)-phosphate (50) | 1,820 | 30 | 84 | 83 | −18 |
| Tris(butyl lactate)-phosphate (50) | | | 70 | 61 | |
| Bis(ethyl lactate)-phthalate (50) | 412 | 50 | 74 | 59 | |
| Tris(methyl lactate)-phosphate (50) | 2,030 | 50 | 84 | 79 | −15 |
| Bis(methyl lactate)-phthalate (50) | 5,660 | 135 | 90 | 83 | |
| Bis (2-ethyl hexyl lactate)-maleate (50) | 1,600 | 100 | 75 | 73 | |
| Bis(2-ethyl butyl lactate)-phthalate (50) | 2,140 | 75 | 70 | 68 | |
| Bis(2-ethyl hexyl lactate)-phthalate (50) | 4,220 | 100 | 78 | 72 | |
| Bis(2-ethyl butyl lactate)-maleate (50) | 1,350 | 120 | 70 | 62 | |
| Bis(methyl lactate)-phthalate (25) | 665 | 95 | 96 | 94 | |
| Bis(methyl lactate)-phthalate (33) | 2,000 | 35 | 70 | 68 | |

In addition to the above examples, ethyl cellulose samples were plasticized with an equal weight of the following plasticizers, using the same technique as described above:

A. Bis(allyl lactate)-adipate
B. Bis(allyl lactate)-citraconate
C. Bis(allyl lactate)-chloromaleate
D. Bis(allyl glycolate)-phthalate
E. Bis(beta-chloroethyl lactate)-sebacate All of these were found to be compatible. The adipate gave a very soft, weak product, while the citraconate gave a tough, flexible film. The other two were softer but had good tensile strength.

The data in the table include results obtained with ethyl cellulose plasticized with caster oil, which has been used in the prior art. The results show that the plasticizers of the present invention may be used to give sheets or films having higher tensile strengths than that of the ethyl cellulose-caster oil film. If desired, the complex esters shown in the table may be used as mixtures in plasticizing cellulose derivatives.

Having thus described our invention, we claim:

1. A plastic composition comprising a cellulose ether and a plasticizer therefor, said plasticizer consisting of bis(allyl lactate)-maleate.

2. A plastic composition essentially consisting of ethyl cellulose and a plasticizer therefor, said plasticizer essentially consisting of bis(allyl lactate)-maleate.

CHESSIE E. REHBERG.
CHARLES H. FISHER.

REFERENCES CITED

The following references are of record in the file of this patent:

UNITED STATES PATENTS

| Number | Name | Date |
|---|---|---|
| 1,979,559 | Kyrides | Nov. 6, 1934 |
| 2,021,121 | Dykstra et al. | Nov. 12, 1935 |
| 2,049,565 | Holt | Aug. 4, 1936 |
| 2,147,242 | Conover | Feb. 14, 1939 |
| 2,260,295 | Carruthers | Oct. 28, 1941 |
| 2,379,251 | Muskat et al. | June 26, 1945 |
| 2,384,117 | Muskat et al. | Sept. 4, 1945 |

FOREIGN PATENTS

| Number | Country | Date |
|---|---|---|
| 421,420 | Great Britain | Dec. 20, 1934 |